United States Patent [19]

Marie

[11] Patent Number: 5,097,523
[45] Date of Patent: Mar. 17, 1992

[54] DEVICE FOR SEALING THE ENTRY OF A CABLE INTO AN ALVEOLAR MULTICONTACT CONNECTOR

[75] Inventor: Alain J. Marie, Thiais, France
[73] Assignee: Radiall, Rosny-Sous-Bois, France
[21] Appl. No.: 606,146
[22] Filed: Oct. 31, 1990

[30] Foreign Application Priority Data

Nov. 6, 1989 [FR] France ............... 89 14500

[51] Int. Cl.⁵ .................................. G02B 6/36
[52] U.S. Cl. .................................. 385/59
[58] Field of Search ............ 350/96.2, 96.21, 98.22

[56] References Cited

U.S. PATENT DOCUMENTS

4,712,860 12/1987 Corrales .................. 350/96.2
4,795,231 1/1989 Tanabe .................... 350/96.21

FOREIGN PATENT DOCUMENTS

0216643 1/1987 European Pat. Off.
2407579 5/1979 France.
2111243 6/1983 United Kingdom.

Primary Examiner—John D. Lee
Assistant Examiner—John Ngo
Attorney, Agent, or Firm—Schweitzer Cornman & Gross

[57] ABSTRACT

Apparatus for sealing the entry of an optical cable (11) having an optical fiber (16) into alveolar multicontact connector of the type which comprises an insulating element (1) provided with a plurality of alveoli (2) configured to receive and hold contacts installed at the ends of said cables, and a sealing blanket of an elastically deformable material arranged on one face of the insulating element and having a plurality of passages (7) corresponding in number to the alveoli, each of the passages (7) being aligned with an alveolus, and being elastically extendable in the radial direction during introduction of a cable, characterized in that said apparatus includes a rigid cylindrical coupler (18) mounted with play about the cable (11) and around a part (20) of a contact (10) mounted at the end of the cable, said rigid cylindrical coupler (18) has a length greater than the thickness of the sealing blanket (3) to project beyond the back of the said blanket when said coupler is engaged in the passage (7) of the sealing blanket (3), a socket (25) is mounted about a part (22) of the rigid cylindrical coupler (18) and a part of the cable (11) in back of said rigid cylindrical coupler, said socket (25) forming a complete seal with the cylindrical coupler with its front part (24) and with the cable at its back part (26) and being elastically deformable in its intermediate part (27) between the said front and back parts (24 and 26).

6 Claims, 1 Drawing Sheet

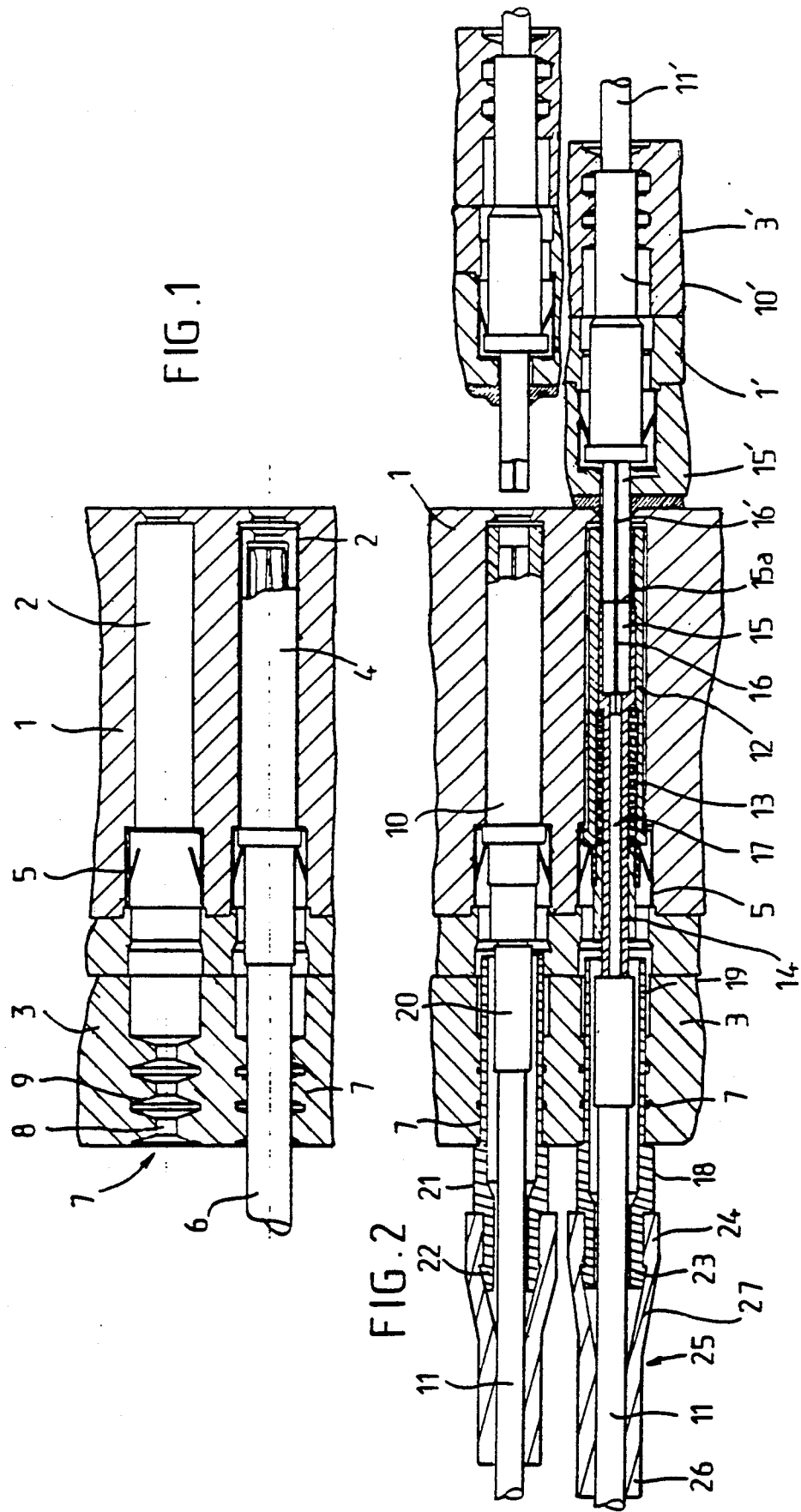

DEVICE FOR SEALING THE ENTRY OF A CABLE INTO AN ALVEOLAR MULTICONTACT CONNECTOR

BACKGROUND OF THE INVENTION

The present invention relates to a device which allows sealing the entry of a cable, particularly an optical cable, into a sealed alveolar multicontact connector, of the type which comprises an insulating element provided with a plurality of alveoli made to receive and hold contacts installed at the end of cables, and a sealing blanket, made of an elastically deformable material, arranged on one face of the insulating element, and having a plurality of passages with regard to the alveoli, each of the passages being aligned with an alveolus, elastically extendable in the radial direction during introduction of a cable, and made and sized to surround the inserted cable so that it is tightly held and sealed.

Such connector elements are known and used for electrical cables in various applications, particularly in the aeronautics field.

The passages in the sealing blankets have sizes and dimensions adapted to the electrical cables to be put into place, to obtain optimum sealed hold of these cables, where the said cables can have an outside diameter between 1.6 and 2.7 mm, for example, for a size 16 contact.

A sealing problem comes up if one wishes to put cables with a lesser outside diameter, particularly optical cables, into the same connector element, in order to achieve electrical connections, on the one hand, and connections of optical cables, on the other hand, in the same connector.

In fact, in this case, the compression effect achieved on the outside sheath of the cable with the thinnest diameter at the location of the passages of the sealing blanket is too low to assure a perfect seal around the cable, particularly in those applications where a major pressure differential exists between the outside and the inside of the connector element.

As an example, one can cite the case of connectors used for the wiring, particularly the control consoles, of non-pressurized vehicles, such as combat planes, for example.

In this case, contaminants, particularly fluids, can penetrate into the interior of the connector alveoli and detrimentally affect the quality of the connection achieved.

Furthermore, during connection of optical cables using contacts which comprise a compression spring intended to assure axial support of the face of the optical fiber end against the face of the optic fiber to be connected, the forces exerted by the sealing blanket on the optic cable to be placed in a passage of the sealing blanket detrimentally affect the quality of the optical connection.

SUMMARY OF THE PRESENT INVENTION

The present invention sets itself the task of creating a device which makes it possible to assure an excellent seal of the cable entry, particularly for optical cables, which have a thinner outside diameter than the outside diameter of the electrical cables for which the sealed connector element was designed, without any modification in the latter, which therefore makes it possible to put cables with different diameters into place in the same connector element, particularly electrical cables in certain alveoli, and optical cables in others.

The device pursuant to the invention is characterized by the fact that it comprises a rigid cylindrical coupler mounted with play around the cable, and around a part of the contact mounted at the end of the cable, the said rigid cylindrical coupler having a length greater than the thickness of the sealing blanket, in such a manner as to go beyond at least the back of the blanket when it is in position engaged in the passage of the sealing blanket, and a socket mounted around a part of the rigid cylindrical coupler and a part of the cable in back of the said rigid cylindrical coupler, the said socket forming a complete seal with the cylindrical coupler with its front part and with the cable at its back part, being elastically deformable in the intermediate part between the said front and back parts.

The rigid cylindrical coupler has an outside diameter equal to the greatest outside diameter of the cables for which the passages of the sealing blanket are designed at its segment intended to pass through the sealing blanket, in such a manner as to allow a hold, with force and without play, of the rigid cylindrical coupler in the sealing blanket.

Thus, if the optical cable, in the installed position, is made to retract, this retraction causes elastic lengthening in the axial direction, without slip, of the socket which is in one piece with the cable and the rigid cylindrical coupler, while the latter remains immobile due to being held by force in the corresponding passage of the sealing blanket.

Therefore, the device pursuant to the invention can be used for connecting an optical cable comprising a femal contact of a known type, in which the optical fiber is immobilized in a ferrule at the end which runs opposite a compression spring in a tubular contact element of the contact immobilized axially in an alveolus of the insulating element of the connector.

In this case, during introduction of the ferrule of the complementary male contact comprising an optical fiber to be coupled, retraction of the ferrule comprising the optical fiber of the female contact occurs, against its compression spring, and therefore a sliding movement towards the back of the cable which is in one piece with this ferrule results.

The lengthening without slip which was mentioned above, with regard to the elastic socket, in combination with the presence of the rigid cylindrical coupler, allows this retraction movement of the cable without any loss in seal in the zone where the cable enters into the connector element.

In the case where the entry opening of the passage through the sealing blanket has a diameter greater than the outside diameter of the front segment of the rigid cylindrical coupler intended to engage with the passage of the sealing blanket, the rigid cylindrical coupler advantageously has an intermediate segment with a greater diameter behind this front segment, corresponding at least to the diameter of the passage entry.

The elastically deformable socket can advantageously have the general form of a "nipple" and comprise a front part with a greater diameter, provided, if necessary, with hooking means intended to work together with hooking means provided on the rear part of the rigid cylindrical coupler, and a rear part with a inside nominal diameter less than the outside diameter of the cable, to rest against the cable elastically, with force, along its entire length.

Other advantages and characteristics of the invention will become evident from reading the following description of an embodiment, with reference to the attached drawing, in which:

Description of the Drawings

FIG. 1 is a partial view, in cross-section, of a conventional sealed connector element, illustrating the placement of an electrical cable equipped with an end contact, and FIG. 2 is a partial view, in cross-section, of the same sealed connector element, showing the connection of optical cables and implementing the device pursuant to the invention.

DETAIL DESCRIPTION OF THE INVENTION

Referring to FIG. 1, this shows a schematic partial cross-section of an insulating element 1 of a connector element, in which there are alveoli 2, a sealing blanket 3 being arranged on one side of the insulating element 1.

The upper alveolus 2 is shown empty, while the lower alveolus contains a female electrical contact 4 held in the alveolus 2 by means of a conventional retainer clip 5. The contact 4 is fixed to the end of an electrical cable 6 which traverses the sealing blanket 3 and is held in it on the inside of a passage designated overall as 7, alinged with the alveolus 2, and which can be seen better in the upper part of FIG. 1.

This passage comprises a central conduit 8 with a diameter less than the outdide diameter of the thinnest cable to be put in, and a plurality of concentric recesses 9, generally in the shape of a truncated cone, the greatest diameter of which is slightly greater than that of the thickest cable to be put in place, the drawing showing such a truncated-cone recess opening into the entry of the passage 7, and two units of such truncated-cone recesses coming together at their base.

The recesses 9 with the largest diameter allow radial expansion of the central conduit 8 during introduction of a cable 6 which has a diameter greater than the diameter of the conduit 8.

Thus, as can be seen in the lower part of FIG. 1, once the cable is introduced in the passage 7, it is held tightly there under the force exerted by the elastic nature of the sealing blanket 3, which is generally made of an elastomer material.

FIG. 2 shows a partial cross-section of the connector element illustrated in FIG. 1, with two alveoli 2 used for connecting optical fiber cables, the optical connection being illustrated in the non-coupled state in the upper alveolus and in the coupled state in the lower alveolus.

The invention is illustrated for a female optical contact 10 installed at the end of an optical cable 11 which, as can be seen in the drawing, has a diameter of its outside sheath which is less than the diameter of the outside sheath of the thickest electrical cable 6 for which the connector element was designed.

The female contact 10 comprises a tubular exterior contact element 12 immobilized in the alveolus in the conventional manner, using a retainer clip 5.

On the inside of the tubular exterior contact element 12, a case 14 runs against a compression spring 13, and at the end of the former, a ferrule 15 is attached, with the end 15a of which the end of the optical fiber 16 of the cable 11 is flush.

The optical fiber is immobilized, particularly by gluing, in the end part of the ferrule 15, and the intermediate sheath 17 of the of the cable is also fixed in the axial hole of the case 14 by gluing.

Thus, when the ferrule 15 is made to retract for the connection, as shown in the lower part of FIG. 2, by introduction of a ferrule of a male optical contact element 10', introduced in the alveolus of a complementary sealed connection element 1', 3', for connection of the optical fiber 16 to an optical fiber 16' of an optical cable 11', the ferrule 15 and the female contact elements 10 which are in one piece retract against the spring 13 in the tubular contact element 12, which causes retraction of the cable 11 towards the back, as is evident when comparing the positions of the latter at the top and the bottom in FIG. 2.

To allow retraction without any loss in seal at the entry into the connector element, a rigid cylindrical coupler 18, made, for example, of stainless steel, is first of all provided pursuant to the invention, comprising a front segment 19 with an outside diameter essentially corresponding to the outside diameter of the thickest electrical cable 6 illustrated in FIG. 1, this segment 19 preferably having a length slightly larger than the thickness of the sealing blanket 3. The front end of the cylindrical coupler therefore passes beyond into the alveolus of the insulating element, in the embodiment illustrated, and surrounds the cable 11 and the rear part 20 of the contact 10 surrounding the exterior sheath of the cable 11 with play along its entire length.

Behind its segment 19, the cylindrical coupler comprises an intermediate segment 21 with a larger outside diameter, the front end of which rests against the face of the entry to the sealing blanket 3, in such a manner as to cover the truncated-cone introduction recess 9 of the passage 7 of the sealing blanket 3 in the installed position.

The rigid cylindrical coupler 18 finally comprises a rear part 22 provided with an end collar 23 which allows hooking of the front end part 24 of an elastically deformable socket 25, which part has the largest diameter; this socket is made, for example, of an elastomer material; the rear part 26 of this socket, connected with the front part by an intermediate part 27 with a truncated-cone shape, rests elastically and tightly against the sheath of the cable 11. The thickness of the wall of the socket 25 in its intermediate part 27 is less than in its front part 24 and rear part 26.

It is therefore understood that due to the presence around the cable, of the rigid cylindrical coupler 18, on the one hand, and of the elastic socket 25 behind it, on the other hand, there is no possible passage for contaminants around the cable when it is in place, even during retraction of the latter into the position illustrated in the lower part of FIG. 2.

In this case, in fact, the rigid cylindrical coupler 18, and more precisely, its segment 19, is held in the corresponding passage 7 of the sealing blanket 3, and the cable 11 can run inside this cylindrical coupler with axial elastic deformation, in the form of lengthening, without any slip of the socket 25.

Although the invention was described in connection with a particular method of implementation, it is evident that it is not at all limited to this, and numerous variations and modifications can be made without thereby departing from the scope or the spirit of the invention.

I claim:

1. Apparatus for sealing the entry of an optical cable (11) having an optical fiber (16) into an alveolar multicontact connector of the type which comprises an insulating element (1) provided with a plurality of alveoli (2) configured to receive and hold contacts installed at the ends of said cables, and a sealing blanket of an elastically deformable material arranged on one face of the insulating element and having a plurality of passages (7) corresponding in number to the alveoli, each of the passages (7) being aligned with an alveolus and being elastically extendable in the radial direction during introduction of a cable, characterized in that said apparatus includes (a) a rigid cylindrical coupler (18) mounted with play about the cable (11) and around a part (20) of a contact (10) mounted at the end of the cable, (b) said rigid cylindrical coupler (18) has a length greater than the thickness of the sealing blanket (3) to project beyond the back of the said blanket when said coupler is engaged in the passage (7) of the sealing blanket (3), (c) a socket (25) mounted about a part (22) of the rigid cylindrical coupler (18) and a part of the cable (11) in back of said rigid cylindrical coupler, (d) said socket (25) forming a complete seal with the cylindrical coupler with its front part (24) and with the cable at its back part (26) and being elastically deformable in its intermediate part (27) between the said front and back parts (24 and 26);

(e) said optical cable being provided with a female contact (10) having a ferrule (15) at the end of which the optical fiber (16) is glued and immobilized, and (f) said contact (10) is adapted to retract against a compression spring (13) in a tubular exterior element (12) of the contact immobilized in an alveolus (2) of the insulating element (1) of the connector element.

2. Apparatus for sealing the entry of a cable (11), particularly an optical cable, into an alveolar multicontact connector of the type which comprises an insulating element (1) provided with a plurality of alveoli (2) configured to receive and hold contacts installed at the ends of said cables, and a sealing blanket of an elastically deformable material arranged on one face of the insulating element and having a plurality of passages (7) corresponding in number to the alveoli, each of the passages being aligned with an alveolus, and being elastically extendable in the radial direction during introduction of a cable characterized in that said apparatus includes (a) a rigid cylindrical coupler (18) mounted with play about the cable (11), and about a part (20) of the contact (10) mounted at the end of the cable, (b) said rigid cylindrical coupler (18) has a length greater than the thickness of the sealing blanket (3) to project beyond the back of said blanket when it is engaged in the passage (7) of the sealing blanket (3), and (c) a socket (25) mounted about a part (22) of the rigid cylindrical coupler (18) and a part of the cable (11) in back of said rigid cylindrical coupler, (d) said socket (25) forming a complete seal with the cylindrical coupler with its front part (24) and with the cable at its back part (26) and being elastically deformable in its intermediate part (27) between the front (24) and back (26) parts.

3. Apparatus pursuant to claim 2, characterized in that (a) the rigid cylindrical coupler (18) has an outside diameter at segment (19) equal to the greatest outside diameter of cables for which the passages (7) of the sealing blanket (3) will accomodate passage through the sealing blanket to effect a secure gripping of the rigid cylindrical coupler in the sealing blanket.

4. Apparatus pursuant to claim 3 characterized in that (a) the elastically deformable socket (25) includes a front part with an enlarged diameter (24) provided with hooking means adapted to cooperate with corresponding hooking means (23) provided on the rear part (22) of the rigid cylindrical coupler, and said socket includes a rear part (26) with an inside nominal diameter less than the outside diameter of the cable (11) to engage forcibly the cable along its entire length.

5. Apparatus pursuant to claim 2 characterized in that (a) the rigid cylindrical coupler (18) includes an intermediate segment (21) having an increased outer diameter, the front end of which segment (21) rests against the face of the entry into the sealing blanket.

6. Apparatus pursuant to claim 2 characterized in that (a) the elastically deformable socket (25) has a lesser wall thickness in its intermediate part (27) than in its front part (24) and than in its rear part (26).

* * * * *